United States Patent [19]
Cocconi

[11] Patent Number: 5,341,075
[45] Date of Patent: Aug. 23, 1994

[54] COMBINED MOTOR DRIVE AND BATTERY RECHARGE SYSTEM

[75] Inventor: Alan G. Cocconi, Glendora, Calif.

[73] Assignee: A.C. Propulsion, Inc., San Dimas, Calif.

[21] Appl. No.: 28,998

[22] Filed: Mar. 10, 1993

[51] Int. Cl.$^5$ .............................................. H02P 7/00
[52] U.S. Cl. ................................. 318/139; 307/66; 307/801
[58] Field of Search .................. 318/139, 727, 729, 41, 318/105, 376, 799–812; 307/64, 66, 67, 68, 45, 46, 48; 363/55, 56, 26, 37

[56] References Cited

U.S. PATENT DOCUMENTS

| | | | |
|---|---|---|---|
| 3,665,495 | 3/1972 | Carter et al. | 307/67 |
| 3,736,480 | 5/1973 | Lee | 318/139 X |
| 3,974,660 | 8/1976 | Farr | 307/66 |
| 4,366,388 | 12/1982 | Wilkerson | 307/48 X |
| 4,709,318 | 11/1987 | Gephart et al. | 363/37 |
| 4,719,550 | 1/1988 | Powell et al. | 363/37 |
| 4,920,475 | 4/1990 | Rippel | 363/132 |
| 5,017,800 | 5/1991 | Divan | 307/66 |
| 5,099,186 | 3/1992 | Rippel et al. | 318/803 |
| 5,206,782 | 4/1993 | Landmeier et al. | 307/66 X |

*Primary Examiner*—Jonathan Wysocki
*Attorney, Agent, or Firm*—Blakely, Sokoloff, Taylor & Zafman

[57] ABSTRACT

A combined battery recharge and motor drive system employs an essentially conventional polyphase pulse width modulated (PWM) inverter and a polyphase motor which may be reconnected to operate in a battery recharge mode. Single phase or three-phase AC power from an external source is applied across the reconfigured circuit, and the inverter switches are then controlled to operate as a boost switching regulator. Electrostatic (Faraday) shielding techniques and construction allow extremely small ground currents for improved safety an GFI outlet compatibility.

16 Claims, 4 Drawing Sheets

COMBINED MOTOR DRIVE AND BATTERY RECHARGE SYSTEM

BACKGROUND OF THE INVENTION

1. Field of the Invention

This invention relates generally to the field of control electronics for a polyphase electric motor such as an induction or brushless DC motor and specifically to an integrated system for supplying polyphase motor drive signals from a DC source and for recharging the DC source from an external source of AC power.

2. Background Art

Widespread adoption of electric road vehicles has heretofore been hampered, in part, by the lack of suitable charging systems. Existing charging systems often rely on stationary off-board chargers with transformers and/or electronics that are too expensive and/or too heavy to be conveniently carried on board a vehicle. Alternatively, on-board charging systems with reduced cost and bulk may be employed, but at the cost of limited recharging power levels. For example, many of the on-board chargers that have been previously developed implement line frequency phase control with SCRs or triacs. Although these devices are cost effective, they draw power at unacceptably low power factors for wide spread high power applications.

Integrated motor drive and recharge systems have been developed so that certain of the components in the motor drive electronics are also used in a recharge mode as components of a switching regulator. Such an approach facilitates recharging at high power levels with substantial savings in the bulk and cost of the electronics package. For example, U.S. Pat. No. 4,920,475 issued Apr. 24, 1990 to Rippel discloses an integrated traction inverter and battery charger apparatus which integrates the components of a three-phase inverter with an AC line powered battery charger. A full wave rectifier bridge is included in the on-board electronics for conditioning the AC line power.

Another integrated motor drive and recharge system is disclosed in U.S Pat. No. 5,099,186 issued Mar. 24, 1992 to Rippel and this inventor. This system is designed for a dual motor application or for a single motor with dual sets of windings. In either case, the additional motor windings are advantageously employed to eliminate the need for an input bridge rectifier in the recharge mode.

A deficiency in the previously described integrated motor drive and recharge systems is high current in the ground wire connection to the power line. This results in a potential safety hazard if the ground wire is missing or improperly connected. This problem may also cause tripping of ground fault interruption (GFI) protected power outlets.

SUMMARY OF THE INVENTION

The present invention provides a combined battery recharge and motor drive system that is capable of recharging at high power levels without the need for the additional components required by the prior art integrated drive and recharge systems. In particular, the present invention employs an essentially conventional polyphase pulse width modulated (PWM) inverter, whose connections may be selectively decoupled from the respective motor windings in a recharge mode. Single phase or three-phase AC power from an external source is applied across the disconnected phase or phases, and the inverter switches are then controlled to operate as a boost switching regulator with the motor winding inductances used as inductive circuit elements.

By using relatively light and inexpensive relays, the motor control circuitry of the present invention is readily reconfigured between the drive and recharge modes. In the recharge mode, controlled, near unity power factor battery charging is achieved from any single phase or multi-phase power source with a peak voltage that does not exceed the battery voltage. Furthermore, due to the bi-directional nature of the inverter switches, sinusoidal, regulated AC power can be developed from the battery and provided as an output at the recharge port.

By providing proper electrostatic shielding of the motor windings, power transistors and interconnecting cables, extremely small AC leakage currents (less than 5 mA) between the charging circuit and chassis ground can be achieved. This provides additional electrical safety and compatibility with ground fault interrupter (GFI) protected outlets.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods, devices and circuits are omitted so as to not obscure the description of the present invention with unnecessary detail.

Figure 1:
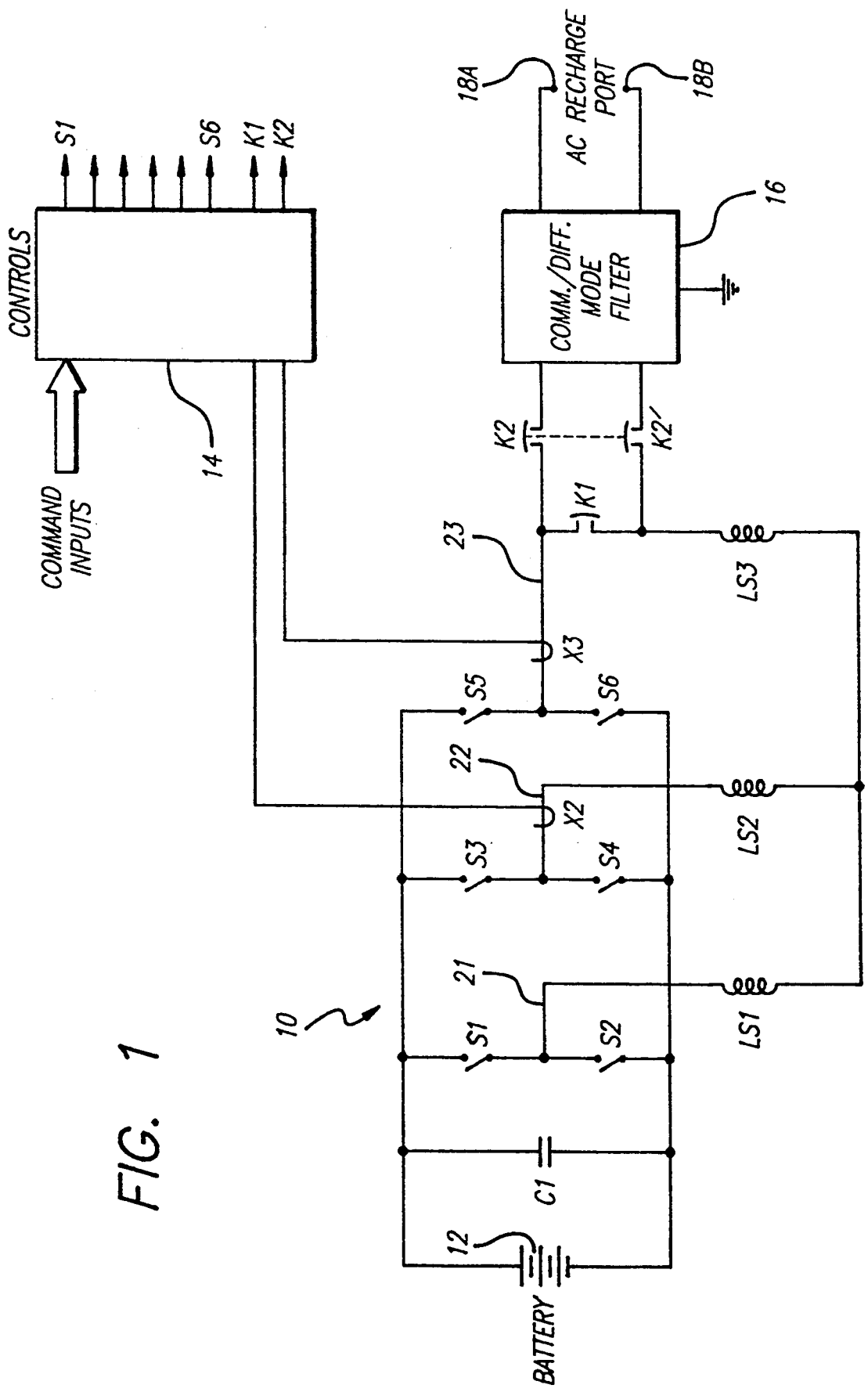
FIG. 1 is a functional schematic circuit diagram of an integrated motor control and recharge system according to the present invention for a three-phase inverter and motor which can be operated as a battery recharger using a single phase AC power source.

Referring to FIG. 1, an integrated motor control and recharge circuit is shown for a three-phase induction motor. The three windings of the motor, arranged in a wye configuration, are indicated in the figure as inductors LS1, LS2 and LS3. The inductance values of the windings are the motor phase to neutral leakage inductances. Although the present invention is illustrated in combination with an AC induction motor, the techniques and devices described herein may also be utilized with other types of electric motors, such as a brushless DC motor.

Current for the motor windings is supplied by a three-phase inverter shown generally as 10. Each winding of the motor is coupled to a respective one of the poles 21, 22 and 23 of the inverter which provide pulse width modulated current signals at phase intervals of 120°. Each of the inverter poles comprises a complementary pair of solid state switches: S1 and S2 for first pole 21, S3 and S4 for second pole 22, and S5 and S6 for third pole 23. The inverter switches are supplied with DC power from a rechargeable DC power source such as battery 12. In one embodiment of the present invention for application in an electrically powered automobile, the battery 12 comprises 28 12-volt lead-acid batteries coupled in series to provide a nominal 336 volts. Filter capacitor C1 is coupled across the battery terminals to damp voltage transients in both the drive and recharge modes.

Switches S1–S6 are controlled by respective signals generated in control electronics unit 14. Control unit 14 receives command input signals from appropriate operator controls and/or a separate on-board computer (not shown). Control unit 14 also receives current sense inputs from current sensor X2 on pole 22 and current sensor X3 on pole 23. A current sensor for pole 21 is not required since the three pole currents must sum to zero. In the drive mode, control unit 14 supplies inverter control signals to switches S1–S6 to generate the desired motor speed and torque. The operation of inverter 10 in the drive mode is well known to those of skill in the art and need not be described in detail.

It will be observed that inverter pole 23 is coupled to its respective motor winding LS3 across relay contacts K1. These contacts are normally closed in the drive mode so that inverter 10 is coupled to the motor in a conventional manner. Relay contacts K1 are opened in the recharge mode so that the motor windings and elements of inverter 10 may be advantageously employed to operate as a switching regulator.

An AC recharge port with terminals 18a and 18b is provided for coupling to an external source of AC power. Such source is preferably a conventional 60 Hz, 240 V supply, although a 120 V supply may also be used with a consequential increase in the time required for recharging battery 12. In fact, any AC input voltage may be used, provided that the peak voltage does not exceed the battery voltage. The AC recharge port is coupled to common mode/differential mode filter 16 which isolates switching ripple and spikes from the recharge port. The outputs of filter 16 are coupled to relay contacts K2 and K2' which are coupled, respectively, to inverter pole 23 and motor winding LS3. In the drive mode, relay contacts K2 and K2' are normally open so that the current drive signal from inverter pole 23 is not loaded by filter 16. Relay contacts K2 and K2' are closed in the recharge mode so that filtered AC power is applied across the open relay contacts K1.

In the recharge mode, control electronics unit 14 supplies control signals to switches S1 and S2 to maintain them in an off (open) condition. Switch pairs S3–S4 and S5–S6 are controlled to toggle on and off at a rate to achieve the desired line current draw from the external power source. Such switching rate is, of course, also a function of the inductance values for windings LS2 and LS3. It will be understood that switches S3–S6 in combination with motor winding inductances LS2 and LS3 operate as a boost switching regulator to provide DC power across the terminals of battery 12. The switches may be controlled to achieve any desired power factor, including unity. Furthermore, active power factor correction may be employed to insure a sinusoidal current wave form.

The present invention may also be advantageously employed to operate as an AC power source driven by battery 12. Single phase AC power is developed by controlling switches S3–S6 to operate as a single phase inverter. In such power generation supply mode, relay contacts K1 are maintained open and relay contacts K2 and K2' are closed so that filtered AC power is provided at terminals 18a and 18b of the AC recharge port.

The present invention is a significant improvement over prior art integrated drive and recharge systems. Since the recharge mode of the present invention operates without an input bridge rectifier, not only are cost and weight savings realized, but a superior waveform is achieved. In this regard, crossover distortion of the AC sinusoidal signal is eliminated. Furthermore, higher power efficiency in the recharge mode is achieved since there are no rectifier losses.

The controller of the present invention may also be operated in a mode so as to discharge battery 12 into a power grid coupled to terminals 18a and 18b of the AC recharge port. This mode is useful for fully discharging battery 12 prior to a recharge cycle. It is now known that periodic deep discharging of a rechargeable battery can result in improved battery capacity over its life cycle. The controller of the present invention allows battery 12 to be discharged into a power grid rather than dissipating its stored energy through a resistive load. This obviates the need for a high dissipation resistor for battery conditioning and conserves the energy stored in the battery.

Figure 2:
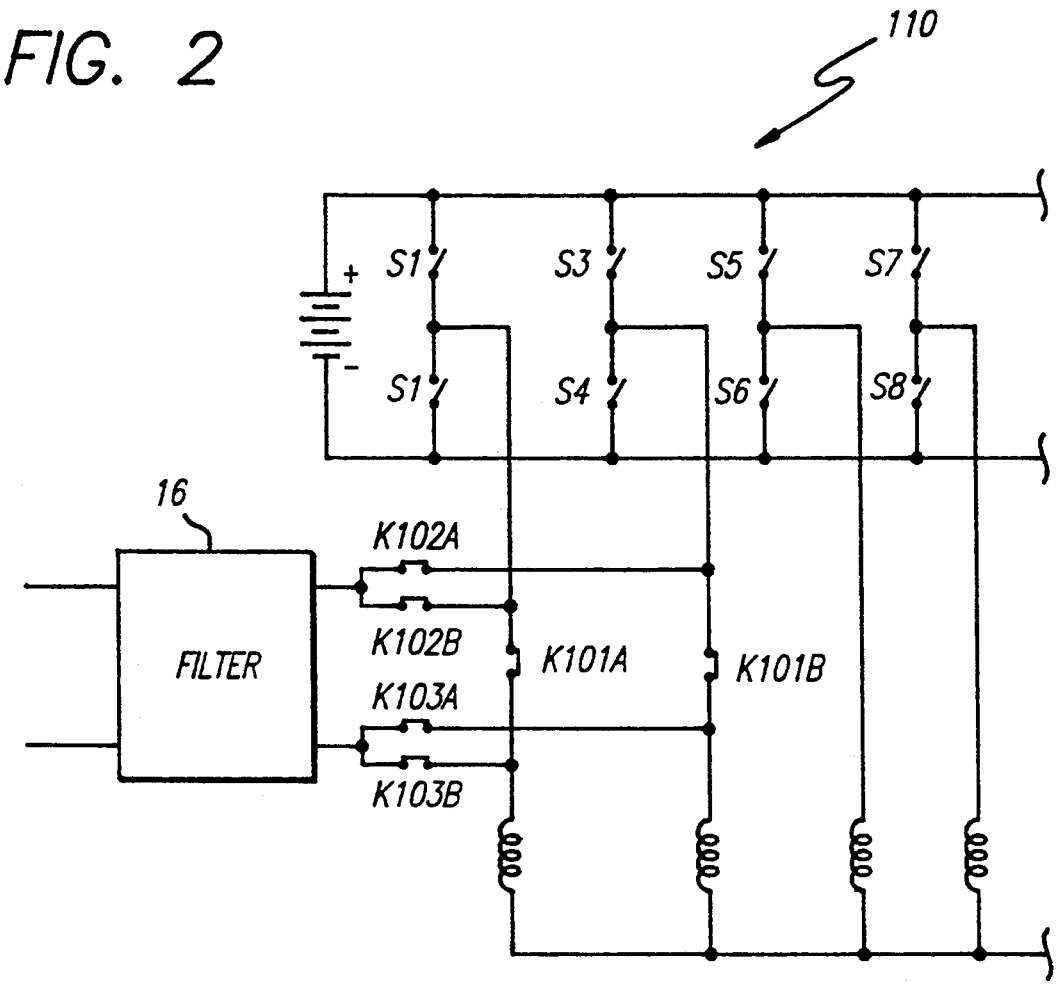
FIG. 2 is a functional schematic circuit diagram of a more general embodiment of the present invention for an inverter and motor having an arbitrary number of phases and that can be operated as a battery recharger using a single phase AC power source.

Although the present invention has been illustrated in connection with a three-phase motor, it is to be understood that this is not a limiting feature of the invention and that the invention may also be implemented with motors having other phase multiplicities. FIG. 2 illustrates a more general embodiment of the present invention, with a motor and inverter 110 having $N_1$ phases. As in the previously described embodiment, inverter 110 comprises a plurality of paired solid state switches, each pair being coupled to a respective motor winding. In the drive mode, relay contacts K101a and K101b are closed to provide continuity between switch pairs S1/S2 and S3/S4 and their respective motor windings. In the recharge mode, relay contacts K101a and K101b are open, while relay contacts K102a, K102b, K103a and K103b are closed to provide continuity between input filter 16 and inverter 110. It will be recognized that any number of phases up to $N_1$ may be utilized in the recharge mode by providing sets of relay contacts K101, K102 and K103 for each of the desired phases.

Figure 3:
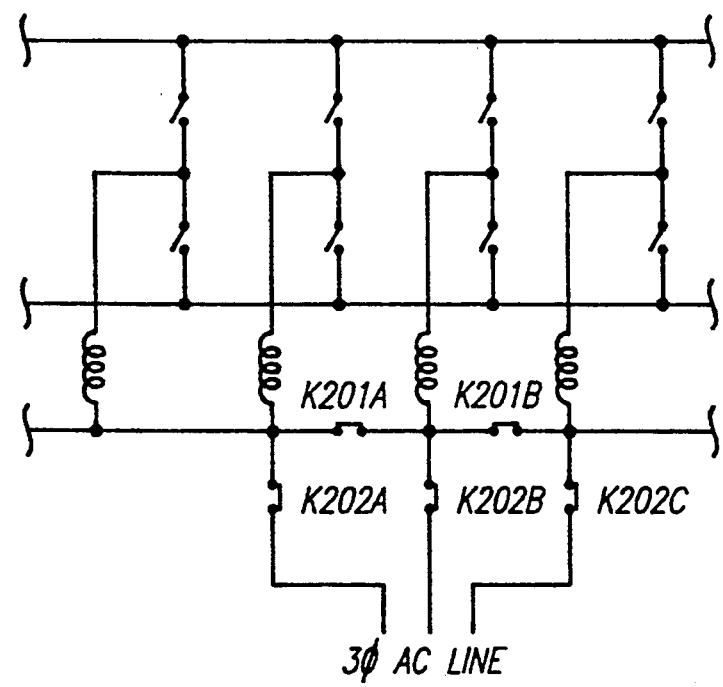
FIG. 3 is a functional schematic circuit diagram of an alternative embodiment of the present invention adapted for battery recharging using a three-phase AC power source.

FIG. 3 illustrates a further general embodiment of the present invention adapted for connection to a three-phase power supply for battery recharging. In this embodiment, each phase of the three-phase AC power input is connected to one or more of the motor windings across relay contacts K202a, K202b and K202c. In this embodiment, the drive mode relay contacts are moved from the inverter side of the motor windings to the neutral side of the windings. Relay contacts K201a and K201b are closed in the drive mode to establish the neutral connection for all of the motor windings.

A significant aspect of the motor drive system described herein is the shielding and isolation method employed to reduce the common mode currents to a level compatible with conventional ground fault interrupter (GFI) circuits. Extensive electrostatic (Faraday) shielding is utilized to reduce ground currents between chassis ground and circuit components that have high rate voltage transitions (i.e., high dV/dt).

Figure 4:
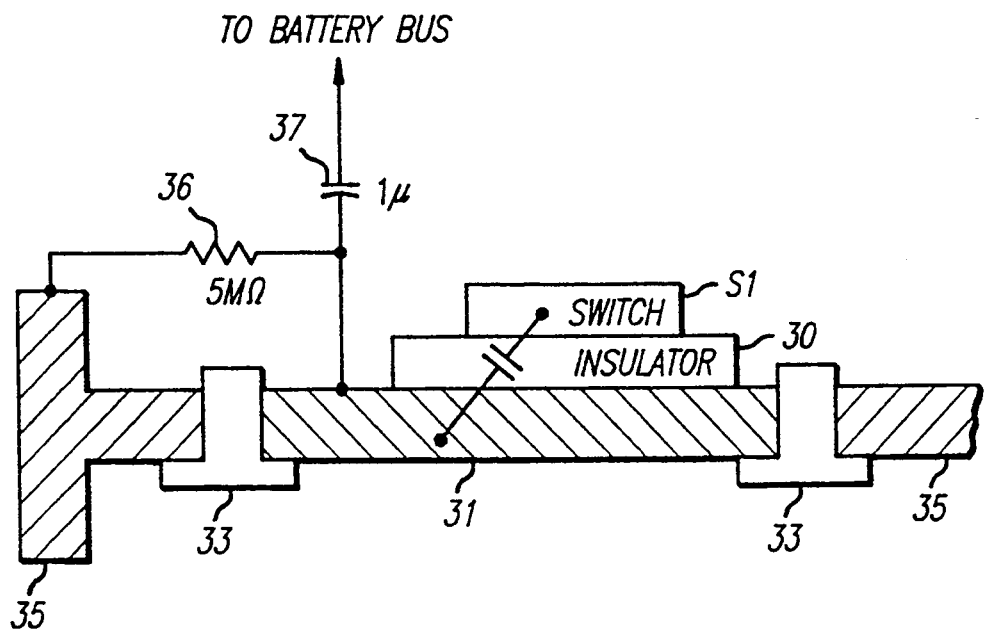
FIG. 4 is a partial cross-sectional view illustrating a preferred form of electrostatic shielding for the power transistor switches of the inverter used in the present invention.

Referring now to FIG. 4, a preferred method of providing electrostatic shielding for the power transistors, e.g., S1–S6 of FIG. 1, is illustrated. An exemplary switch S1 is shown mounted on insulating substrate 30. Substrate 30 is mounted on heat sink 31 for dissipation of the heat generated by switch S1. As is conventionally practiced in the art, heat sink 31 is preferably a metallic structure with a high surface area to volume ratio, whereas substrate 30 is preferably an electrically insulating material with a relatively high thermal conductance. The assembly of switch S1, substrate 30 and heat sink 31 is mounted to the chassis 35 of the vehicle or other structure, but is electrically isolated therefrom by insulator 33.

It will be recognized that the assembly of switch S1, substrate 30 and heat sink 31 will inherently have some value of stray capacitance represented in the figure by capacitor 34 which injects current into the heat sink. This capacitive current is shunted back to the battery bus by coupling heat sink 31 to either the positive or negative bus through capacitor 37. Resistor 36 has a high resistance value, for example, 5 MΩ, and provides a DC leakage path for both the stray capacitance and capacitor 37, maintaining the heat sink at the same DC potential as the chassis.

Figure 5:
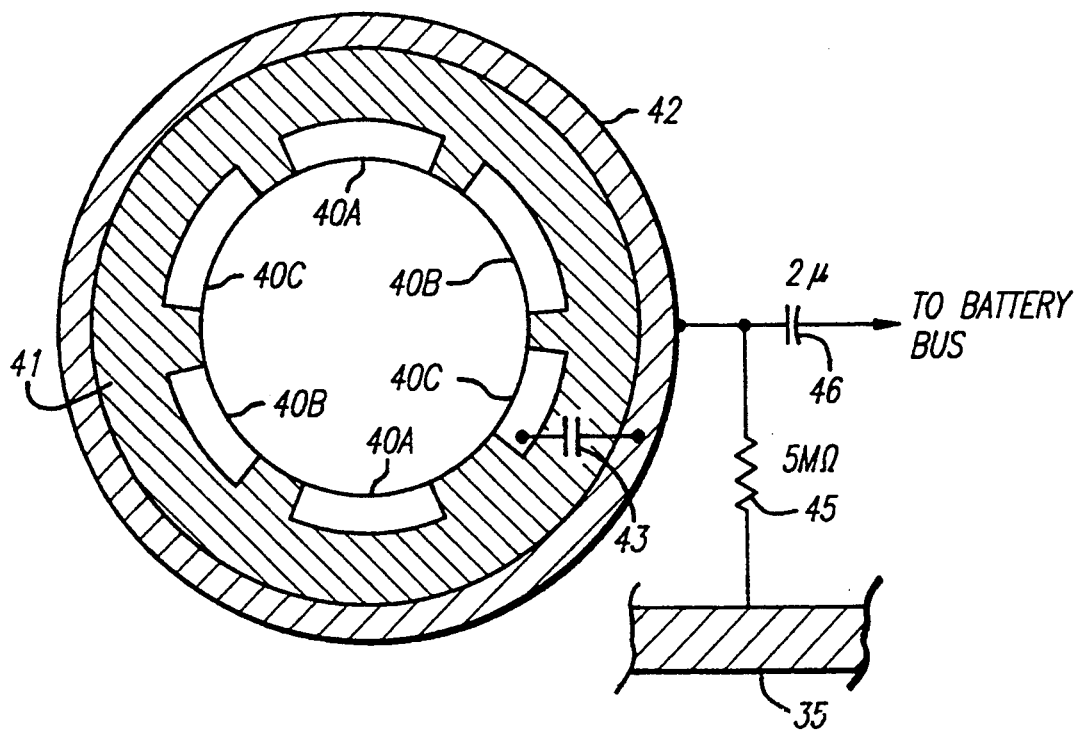
FIG. 5 is a partial cross-sectional view illustrating a preferred form of electrostatic shielding of the motor stator used in the present invention.

FIG. 5 illustrates the electrostatic shielding of the motor stator. The motor windings 40a, 40b and 40c are shown in cross-sectional view. The windings are surrounding by insulation 41 and then by metallic motor housing or chassis 42. Here again, there is inherent stray capacitance between the motor windings and the motor housing as represented by capacitor 43. In a manner similar to that shown in FIG. 4, this stray capacitive current is shunted back to the battery by electrically coupling the motor chassis 42 to the positive or negative bus through capacitor 46. In addition, leakage resistor 45 is coupled between motor chassis 42 and vehicle chassis 35.

Figure 6:
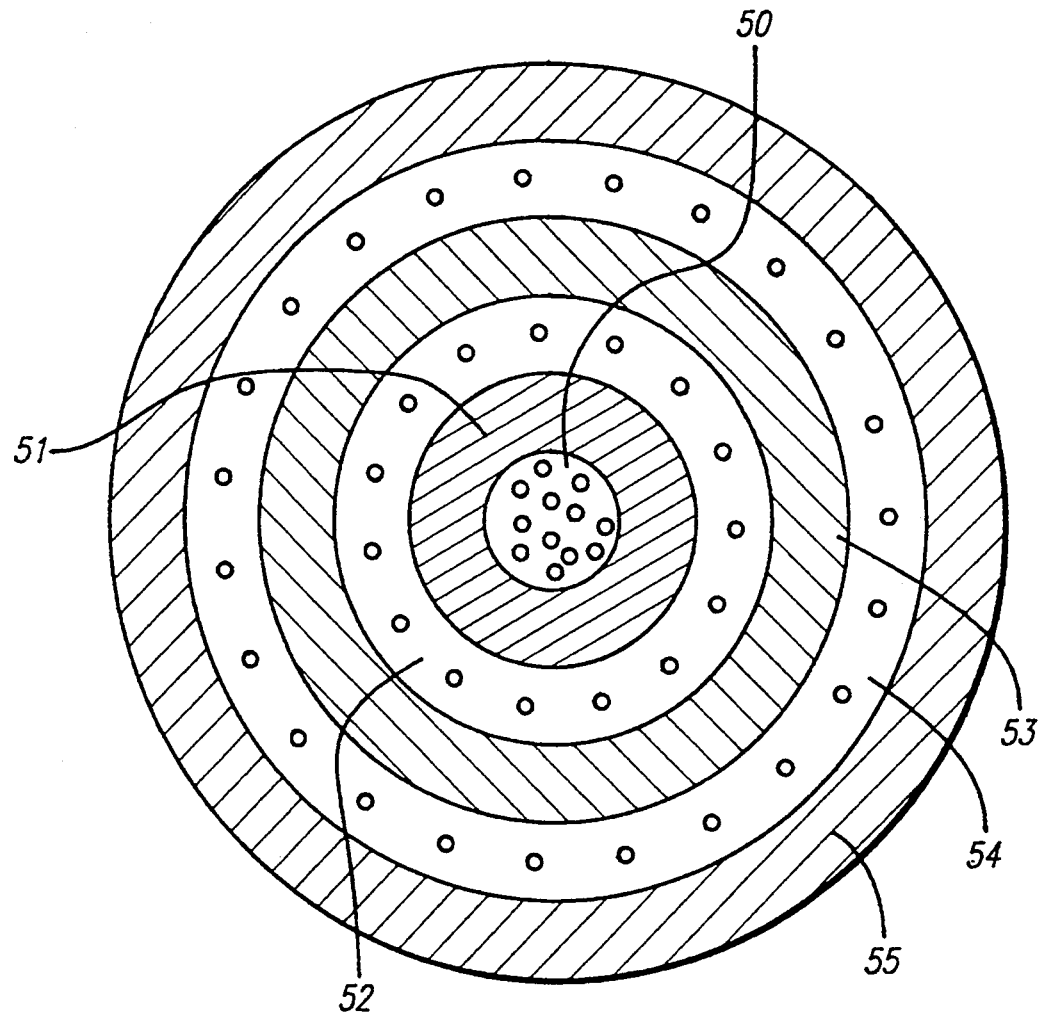
FIG. 6 is a cross-sectional view illustrating a preferred form of electrostatic shielding for a power cable connecting a pole of the inverter to its respective motor winding.

FIG. 6 illustrates the electrostatic shielding of one of the power cables coupling an inverter pole to its respective motor winding, for example, conductor 21 of FIG. 1. The center conductor 50 is surrounded by insulation layer 51. A metallic shield 52 surrounds insulation layer 51 and is coupled to either of the positive or negative busses connected to the battery terminals. Shield 52 is surrounded by insulation layer 53, and optionally an additional shield 54 which may be connected to the vehicle chassis or other structure. Finally, the cable has an outer insulation jacket 55.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

I claim:

1. An integrated motor drive and power source recharging system comprising:

a polyphase electric motor having a plurality of motor windings;

a rechargeable DC power source having a positive terminal and a negative terminal;

a plurality of bi-directional switching means for supplying electrical current to respective ones of the plurality of motor windings in a drive mode, each of the switching means having positive and negative terminals coupled in parallel to the positive and negative terminals of the DC power source, respectively, each of the switching means further having a center terminal coupled to a respective one of the motor windings in the drive mode;

an AC port having first and second terminals for connection to a source of AC electrical power;

first contactor means for selectively decoupling the center terminal of a first one of the plurality of switching means from its respective first motor winding in any mode other than the drive mode;

second contactor means for selectively coupling the first terminal of the AC port to the center terminal of the first switching means and the second terminal of the AC port to the first motor winding in a recharge mode so as to incorporate the first motor winding as an inductive circuit element in a recharging circuit;

switch control means for operating the plurality of switching means as a polyphase inverter in the drive mode and for operating at least the first switching means as a switching regulator in the recharge mode.

2. The system of claim 1 wherein the motor is a three phase induction motor.

3. The system of claim 1 wherein the switch control means operates the first switching means and one other of the plurality of switching means in combination as a switching regulator in the recharge mode.

4. The system of claim 1 wherein the second contactor means couples the first terminal of the AC port to the center terminal of the first switching means and the second terminal of the AC port to the first motor winding in an AC power generation mode and wherein the switch control means operates at least the first switching means as a DC power inverter in the power generation mode.

5. The system of claim 1 further comprising electrostatic shielding means for reducing capacitive coupling between circuit components of the system and a chassis ground, thereby reducing ground currents.

6. The system of claim 1 wherein said switch control means comprises means for operating the plurality of switching means in a power supply mode, in which the second contactor means is operative as in the recharge mode, for generating AC power from the DC power source and supplying the AC power to the AC port.

7. The system of claim 1 wherein said switch control means comprises means for operating the plurality of switching means in a discharge mode, in which the second contactor means is operative as in the recharge mode, for discharging the DC power source into the source of AC electrical power.

8. An integrated motor drive and power source recharging system comprising:

a polyphase electric motor having a plurality of motor windings;

a rechargeable battery having a positive terminal and a negative terminal;

a plurality of paired solid state switching elements for supplying electrical current to respective ones of the plurality of motor windings in a drive mode, each of the paired switching elements having positive and negative terminals coupled in parallel to the positive and negative terminals of the battery, respectively, each of the paired switching elements further having a center terminal coupled to a respective one of the motor windings in the drive mode;

an AC port having first and second terminals for connection to a source of AC electrical power;

a first relay for selectively decoupling the center terminal of a first one of the plurality of paired switching elements from its respective first motor winding in any mode other than the drive mode;

a second relay for selectively coupling the first terminal of the AC port to the center terminal of the first pair of switching elements and the second terminal of the AC port to the first motor winding in a recharge mode so as to incorporate the first motor winding as an inductive circuit element in a recharging circuit;

a switch control electronics unit for operating the plurality of paired switching elements as a polyphase inverter in the drive mode and for operating at least the first pair of switching elements as a switching regulator in the recharge mode.

9. The system of claim 8 wherein the motor is a three phase induction motor.

10. The system of claim 8 wherein the switch control electronics unit operates the first pair of switching elements and one other pair of the plurality of paired switching elements in combination as a switching regulator in the recharge mode.

11. The system of claim 8 wherein the second relay couples the first terminal of the AC port to the center terminal of the first pair of switching elements and the second terminal of the AC port to the first motor winding in an AC power generation mode and wherein the switch control electronics unit operates at least the first pair of switching elements as a DC power inverter in the power generation mode.

12. The system of claim 8 further comprising electrostatic shielding means for reducing capacitive coupling between circuit components of the system and a chassis ground, thereby reducing ground currents.

13. The system of claim 8 wherein said switch control electronics unit comprises means for operating the plurality of paired switching elements in a power supply mode, in which the second relay is operative as in the recharge mode, for generating AC power from the battery and supplying the AC power to the AC port.

14. The system of claim 8 wherein said switch control electronics unit comprises means for operating the plurality of paired switching elements in a discharge mode, in which the second relay is operative as in the recharge mode, for discharging the battery into the source of AC electrical power.

15. In an electric motor traction system having a polyphase induction motor coupled to a polyphase bridge inverter for generating polyphase motor current signals from a DC power source, a method for recharging the DC power source comprising the steps of:

decoupling a first phase of the polyphase bridge inverter from a corresponding first motor winding;

coupling a first terminal of an AC power source to the first phase of the polyphase bridge inverter;

coupling a second terminal of the AC power source to the first motor winding so as to incorporate the first motor winding as an inductive circuit element in a recharging circuit;

controlling the polyphase bridge inverter to operate as a switching regulator to apply a DC charging voltage to the DC power source.

16. An integrated motor drive and power source recharging system comprising:

a polyphase electric motor having at least three motor windings, each having first and second terminals;

a rechargeable DC power source having a positive terminal and a negative terminal;

a plurality of bi-directional switching means equal in number to the number of motor windings for supplying electrical current to respective ones of the motor windings in a drive mode, each of the switching means having positive and negative terminals coupled in parallel to the positive and negative terminals of the DC power source, respectively, each of the switching means further having a center terminal coupled to the first terminal of a respective one of the motor windings;

an AC port having first, second and third terminals for connection to a source of AC electrical power;

first contactor means for selectively coupling the second terminal of a first and second motor winding to the second terminal of each of the remaining motor windings in the drive mode;

second contactor means for selectively coupling, in a recharge mode, the first terminal of the AC port to the second terminal of the first motor winding, the second terminal of the AC port to the second terminal of the second motor winding, and the third terminal of the AC port to the second terminal of at least one of the remaining motor windings so as to incorporate the first and second motor windings and said at least one of the remaining motor windings as inductive circuit elements in a recharging circuit;

switch control means for operating the plurality of switching means as a polyphase inverter in the drive mode and for operating at least the first and second switching means as a switching regulator in the recharge mode.

* * * * *